United States Patent
Abe

(10) Patent No.: US 7,047,791 B2
(45) Date of Patent: May 23, 2006

(54) VIBRATING DEVICE FOR HYDRAULIC SHOCK ABSORBER

(75) Inventor: Chikatoshi Abe, Tokyo (JP)

(73) Assignee: Kayaba Industry Co., LTD, Tokyo (JP)

( * ) Notice: Subject to any disclaimer, the term of this patent is extended or adjusted under 35 U.S.C. 154(b) by 43 days.

(21) Appl. No.: 10/949,811

(22) Filed: Sep. 27, 2004

(65) Prior Publication Data

US 2005/0072240 A1    Apr. 7, 2005

(30) Foreign Application Priority Data

Sep. 29, 2003  (JP) .............................. 2003-337167
Sep. 29, 2003  (JP) .............................. 2003-337168

(51) Int. Cl.
*G01M 17/04*  (2006.01)
(52) U.S. Cl. ........................ 73/11.09; 73/663
(58) Field of Classification Search ............... 73/11.04, 73/11.09, 663

See application file for complete search history.

(56) References Cited

U.S. PATENT DOCUMENTS 4,355,532 A * 10/1982 Ikeda et al. ................ 73/11.09

OTHER PUBLICATIONS

"Cylindrical Shock Absorber for Vehicle Standard Suspension", Society of Automotive Engineers of Japan, Mar. 30, 1992, pp. 11 and 12.

* cited by examiner

*Primary Examiner*—John E. Chapman
(74) *Attorney, Agent, or Firm*—Rabin & Berdo, P.C.

(57) ABSTRACT

The vibrating device comprises, a vibrating table 3 vibrating upwards and downwards with respect to a vibrating platform 2, and a lower side installation section 4 provided on the vibrating table 3 and having a hemispherical recess surface for supporting the lower end section of a hydraulic shock absorber 6. It further comprises: a holding section 5 for pressing and holding the hydraulic shock absorber 6 towards the vibrating table 3; and an upper side installation section 8 for supporting the front end of the piston rod 7 of the hydraulic shock absorber 6. Moreover, the vibrating device further comprises: a universal joint 30 for coupling the vibrating table 3 and the vibrating platform 2, and a restricting member 31 for restricting the movement of the universal joint 30.

8 Claims, 4 Drawing Sheets

VIBRATING DEVICE FOR HYDRAULIC SHOCK ABSORBER

TECHNICAL FIELD

This invention relates to a vibrating device used for measuring the attenuation characteristics of a hydraulic shock absorber used in a suspension device of a vehicle, or the like.

BACKGROUND ART

A vibrating device for measuring the attenuation characteristics of a hydraulic shock absorber used in a suspension device of a vehicle, such as an automobile or the like, is disclosed in "Cylindrical shock absorber for vehicle standard suspension" (p. 11–p. 12, $30^{th}$ Mar. 1992, Society of Automotive Engineers of Japan, Inc.)

SUMMARY OF THE INVENTION

In the vibrating device described above, if a hydraulic shock absorber to be tested is attached to the vibrating device, then an installation pin on the vibrating device is inserted into an installation eye on the hydraulic shock absorber, and it is fastened by a nut. In this case, it is necessary that the axis of the hydraulic shock absorber coincides accurately with a vibration direction of the vibrating device, and hence both the tasks of installing the shock absorber and registering it in position are troublesome.

Furthermore, if there is no installation eye on the hydraulic shock absorber, then a separate installation member is necessary and hence the installation task become even more troublesome.

An object of this invention is to provide a vibrating device in which a hydraulic shock absorber can be installed in a simple fashion.

A further object of this invention is to provide a vibrating device whereby, even if there is a degree of axial misalignment in the installation position of the hydraulic shock absorber, this misalignment can be corrected automatically.

In order to achieve these objects, this invention provides a vibrating device for measuring the attenuation characteristics of a hydraulic shock absorber. The vibrating device comprises a vibrating table provided on a vibrating platform vibrating upwards and downwards with respect to a vibrating platform, a lower side installation section provided on the vibrating table and having a hemispherical recess surface for supporting the lower end portion of the hydraulic shock absorber, a holding section provided on the vibrating table for pressing and holding the hydraulic shock absorber towards the vibrating table, and an upper side installation section provided on a supporting frame coupled to the vibrating platform for supporting the front end of the piston rod of the hydraulic shock absorber.

Moreover, this invention also provides a vibrating device for measuring the attenuation characteristics of a hydraulic shock absorber. The vibrating device comprises a vibrating table provided on a vibrating platform vibrating upwards and downwards with respect to a vibrating platform, a universal joint for coupling the vibrating platform with the vibrating table, a restricting mechanism for restricting the free movement of the universal joint, a lower side installation section provided on the vibrating table for supporting the lower end portion of the hydraulic shock absorber, and an upper side installation section provided on a supporting frame coupled to the vibrating platform for supporting the front end of the piston rod of the hydraulic shock absorber.

BEST MODE FOR CARRYING OUT THE INVENTION

Below, an embodiment wherein this invention is applied to a vibrating device for a hydraulic shock absorber for an automobile will be described.

Figure 1:
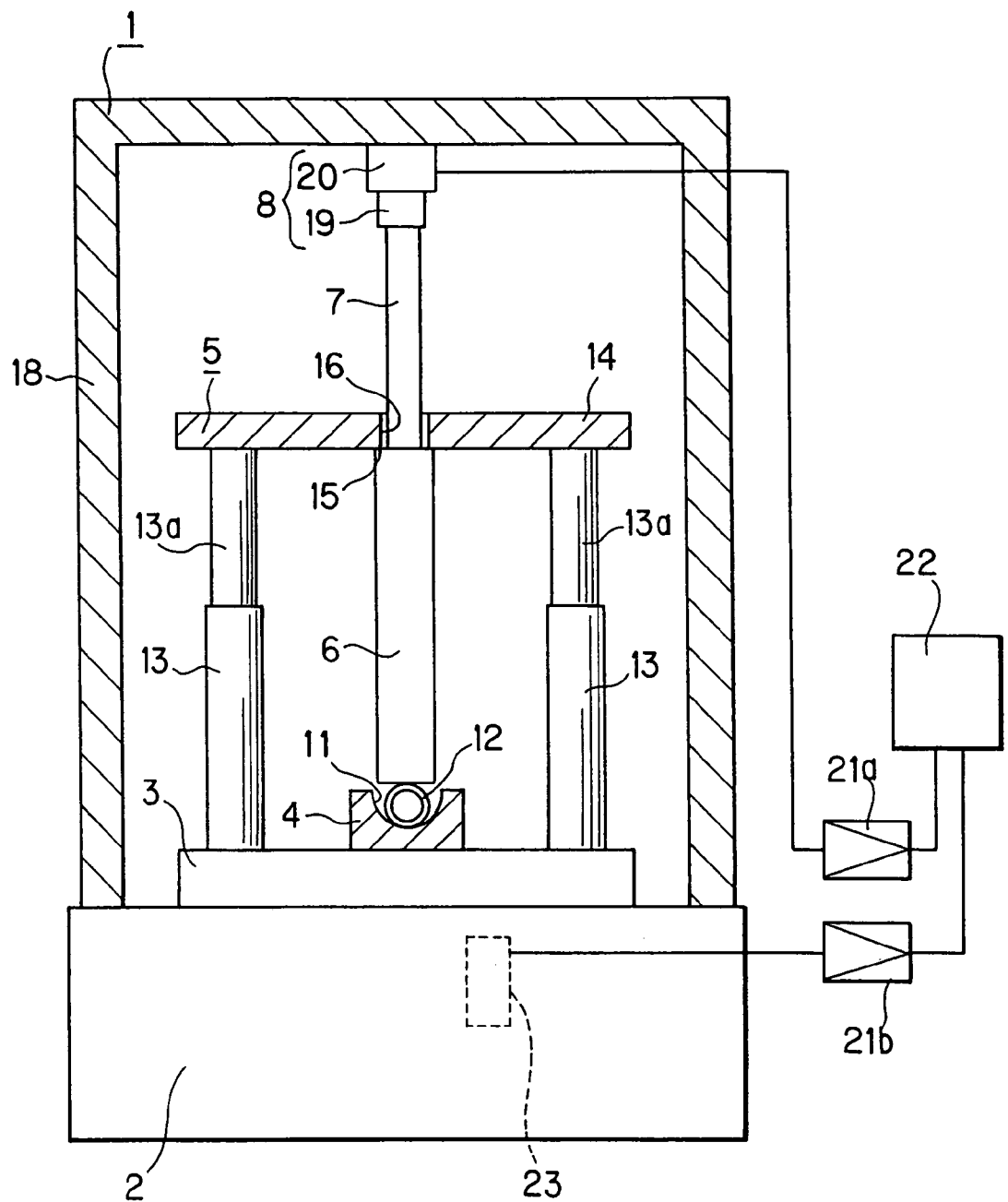
FIG. 1 is front view showing a partial cross-section of a vibrating device of an embodiment of this invention.
Figure 2:
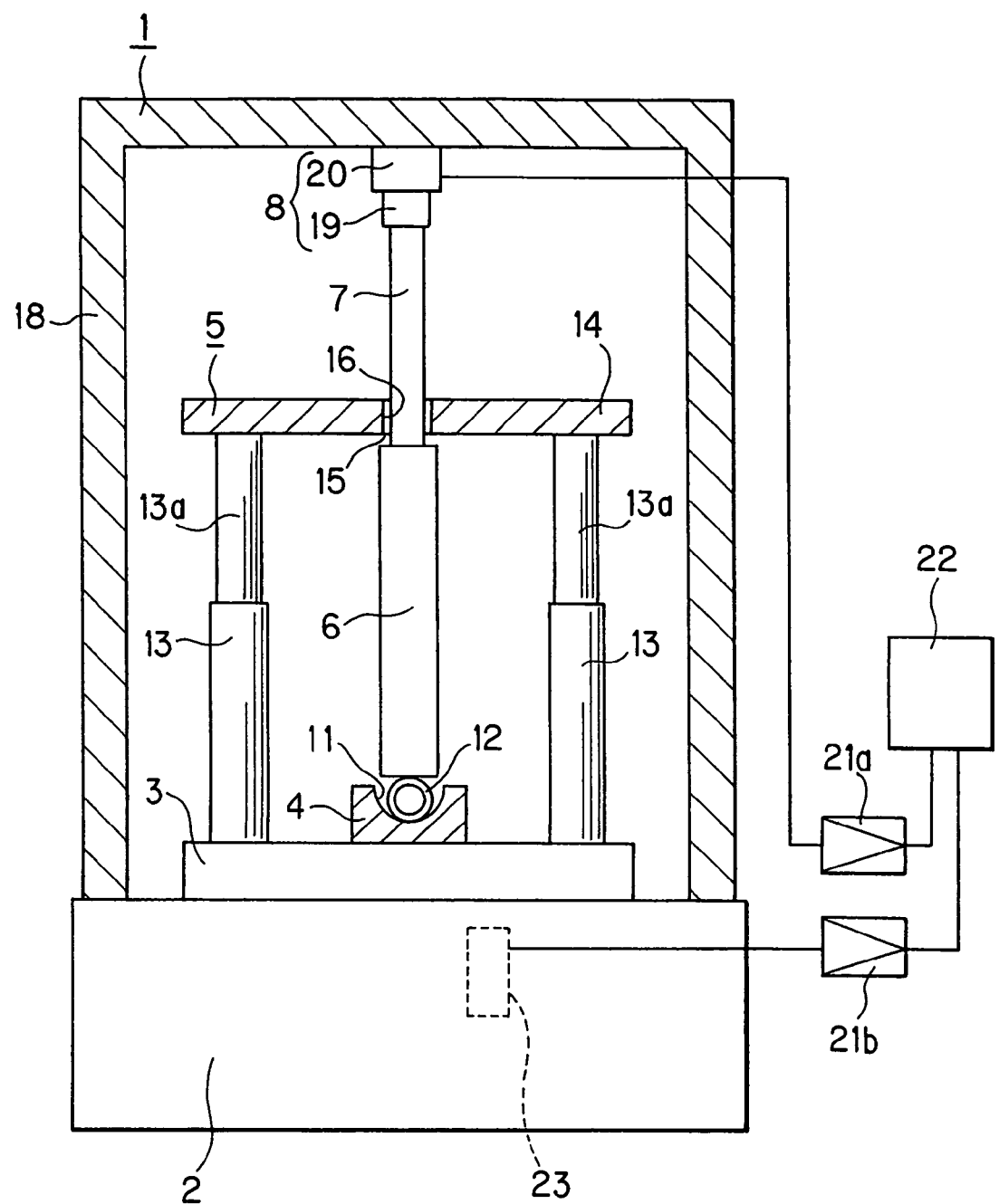
FIG. 2 is a front view showing a partial cross-section illustrating an upper table and an inner tube of the vibrating device in a raised state.

A first embodiment is illustrated in FIG. 1 and FIG. 2.

The vibrating device 1 comprises a vibrating platform 2. The vibrating platform 2 has a hydraulic cylinder (not illustrated), and imparts an upward and downward vibration to a vibrating table 3 disposed on top of the vibrating platform 2 by means of an extending and contracting action of the hydraulic cylinder.

An installation section 4 for supporting the lower end of a hydraulic shock absorber 6 installed on the vibrating device in order to measure the attenuating force thereof, is provided in the central region of the upper surface of the vibrating table 3.

The overall body of the installation section 4 is formed in a three-dimensional shape, and a supporting recess surface 11 which is depressed in a hemispherical shape is provided in the central portion of the upper surface of the installation section 4, in such a manner that simply by placing the installation eye 12 provided on the lower end portion of the hydraulic shock absorber 6 on this supporting recess surface 11, the outer circumferential surface of the installation eye 12 follows the arc-shaped face of the supporting recess surface 11 and is directed to a prescribed stable position.

Furthermore, at least a pair of hydraulic cylinders 13 extending in the vertical direction are provided at the perimeter of the upper surface of the vibrating table 3. The base end of each hydraulic cylinder 13 is fixed to the vibrating table 3, and an upper table 14 is installed horizontally on the front end of each piston rod 13a of the cylinder 13.

A through hole 16 is provided in the center of the upper table 14, the diameter of this through hole 16 being smaller than the outer diameter of the main body section of the hydraulic shock absorber 6 but larger than the diameter of the piston rod 7 of the hydraulic shock absorber 6. Consequently, when the piston rod 7 of the hydraulic shock absorber 6 is inserted into the through hole 16, the upper end of the main body section of the shock absorber element of the hydraulic shock absorber 6 abuts against the edge section 15 surrounding the through hole 16. Thereby, a holding section is constituted for holding the hydraulic shock absorber 6 in a state where it is pressed against the installation section 4 on the vibrating table 3.

Accordingly, when the hydraulic cylinders 13 are in an extended state as shown in FIG. 2, the installation eye 12 on the bottom end portion of the hydraulic shock absorber 6 is placed on the installation section 4, the piston rod 7 of the hydraulic shock absorber 6 having been inserted previously through the through hole 16, whereupon the piston rods 13a of the hydraulic cylinders 13 are caused to contract by switching the operating oil supplied from a hydraulic pressure source (not illustrated), the upper table 14 is caused to descend, and the hydraulic shock absorber 6 is pressed in the direction of the vibrating table 3, in a state where the end portion of the cylinder of the hydraulic shock absorber 6 is engaged with the edge section 15 of the through hole 16.

In this state, the installation eye 12 of the hydraulic shock absorber 6 is guided by the supporting recess surface 11 of the installation section 4, and the hydraulic shock absorber 6 is automatically installed and supported in a stable position.

A gateway-shaped supporting frame 18 is provided extending upward from respective end sections of the vibrating platform 2. An upper installation section 8 is provided in the center of the lower surface of this supporting frame 18. The upper installation section 8 comprises an upper side universal joint 19 with which the front end portion of the piston rod 7 of the hydraulic shock absorber 6 connects, and a load cell 20 which forms a load detector.

Therefore, the front end of the piston rod 7 of the hydraulic shock absorber 6 is fixed to the upper side installation section 8 and the main body section of the hydraulic shock absorber is held and fixed at the upper end section and the lower end section thereof, between the upper table (in other words, the holding section) 14 and the vibrating table 3.

A displacement sensor 23 for detecting the displacement of the hydraulic cylinder for imparting vibration (not illustrated) is provided on the vibrating platform 2. A load signal from the load cell 20 and a displacement signal from the displacement sensor 23 are amplified respectively by means of the amplifiers 21a and 21b, and are then input to an attenuation force display device 22. The attenuation force display device 22 differentiates the displacement signal and calculates the attenuation characteristics of the hydraulic shock absorber 6, namely, the magnitude of the resistance with respect to the speed of the piston in the hydraulic shock absorber 6, from the size of the load at that time, in such a manner that the characteristics can be displayed.

In order to measure the attenuation characteristics of a hydraulic shock absorber 6 provided with an installation eye 12 on the lower end thereof, using the vibrating device 1 constituted in this fashion, firstly, the piston rod 7 of the hydraulic shock absorber 6 to be measured is inserted through the through hole 16 of the upper table 14 previously raised to a raised position, as illustrated in FIG. 2, whereupon the lower end of the hydraulic shock absorber 6 is placed on the installation surface 11 of the lower installation section 4. The overall length of the hydraulic shock absorber 6 can be shortened by pressing and contracting the piston rod 7.

Thereupon, the piston rod 7 is caused to extend, and the upper end section thereof is fixed to the upper side universal joint 19 of the upper installation section 8.

Next, when the piston rods 13a of the hydraulic cylinders 13 are caused to contract, the upper table 14 descends, the upper end of the main body section of the shock absorber engages with the edge section 15 of the through hole 16, and the hydraulic shock absorber 6 is pressed towards the vibrating table 3. Since the supporting recess surface 11 of the installation section 4 of the vibrating table 3 which supports the installation eye 12 on the lower end section of the hydraulic shock absorber 6 has a hemispherical recess surface, the installation eye 12 moves over the arc-shaped surface and is automatically centered and held in a stable position, as shown in FIG. 1.

In this state, if the hydraulic cylinders 13 are set to a locked state, then the hydraulic shock absorber 6 is held accurately in a previously determined position in the vibrating device 1.

If the vibrating platform 2 is operated in this state, then the hydraulic shock absorber 6 installed on the vibrating table 3 performs a repeated upward and downward movement with respect to the piston rod 7, in a state where the central axis of the hydraulic shock absorber 6 is corrected by the centering action of the installation section 4. Due to the extending and contracting action of the hydraulic shock absorber 6, a load signal is output from the load cell 20 and a displacement signal is output from the displacement sensor 23, and on the basis of the values of these signals, the attenuation characteristics corresponding to the piston speed of the hydraulic shock absorber 6 are displayed on the attenuation display device 22.

According to this embodiment, even if there is some misalignment of the central axis of the hydraulic shock absorber 6 when it is installed on the vibrating table 3, this misalignment can be corrected by the action of the installation section 4, and therefore accurate measurement can be performed.

When the hydraulic shock absorber 6 is installed in the vibrating device 1, the piston rod 7 of the hydraulic shock absorber 6 to be measured is inserted through the through hole 16 in the upper table 14, whereupon the lower end section of the hydraulic shock absorber 6 is placed on the supporting recess surface 11 of the installation section 4 and the hydraulic shock absorber 6 can be installed in a prescribed position simply by lowering the upper table 14. Therefore, the installation task is simple and the installation time can be shortened.

Since the supporting recess surface 11 of the installation section 4 has a hemispherical shape, it is possible to achieve an automatic centering function with respect to the installation section 4, regardless of the size of the installation eye 12 of the hydraulic shock absorber 6. Moreover, even in the case of a hydraulic shock absorber 6 which does not have an installation eye 12, provided that the outer diameter thereof is such that it can be placed inside the supporting recess surface 11, then an automatic centering function can be achieved.

Moreover, since the front end section of the piston rod 7 is fixed to the upper installation section 8 by means of the upper side universal joint 19, it is possible to obtain a centering function on the side of the upper installation section 8 also, and hence the attenuation characteristics can be measured even more accurately.

Figure 3:
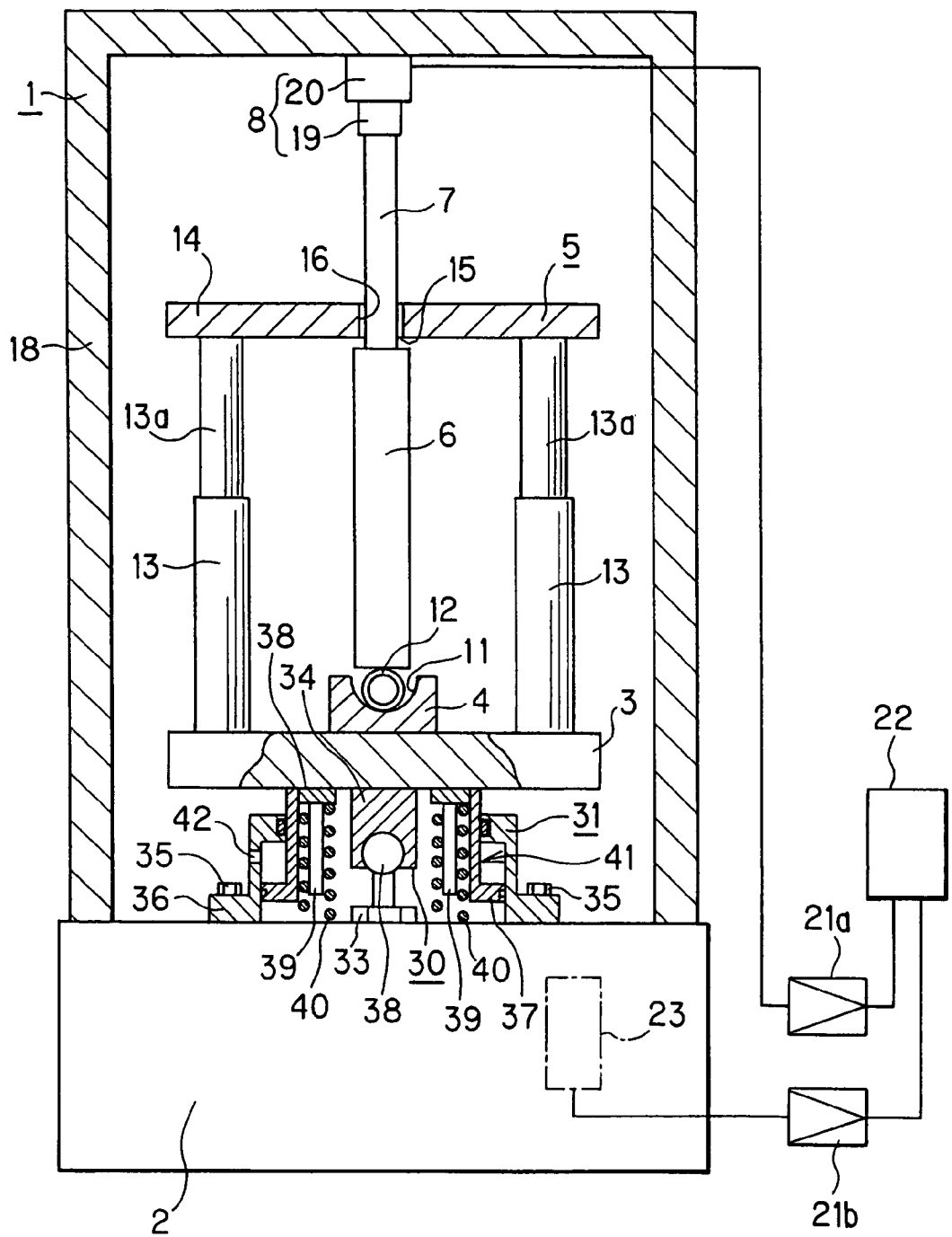
FIG. 3 is a front view showing a partial cross-section of a vibrating device according to a further embodiment of this invention.
Figure 4:
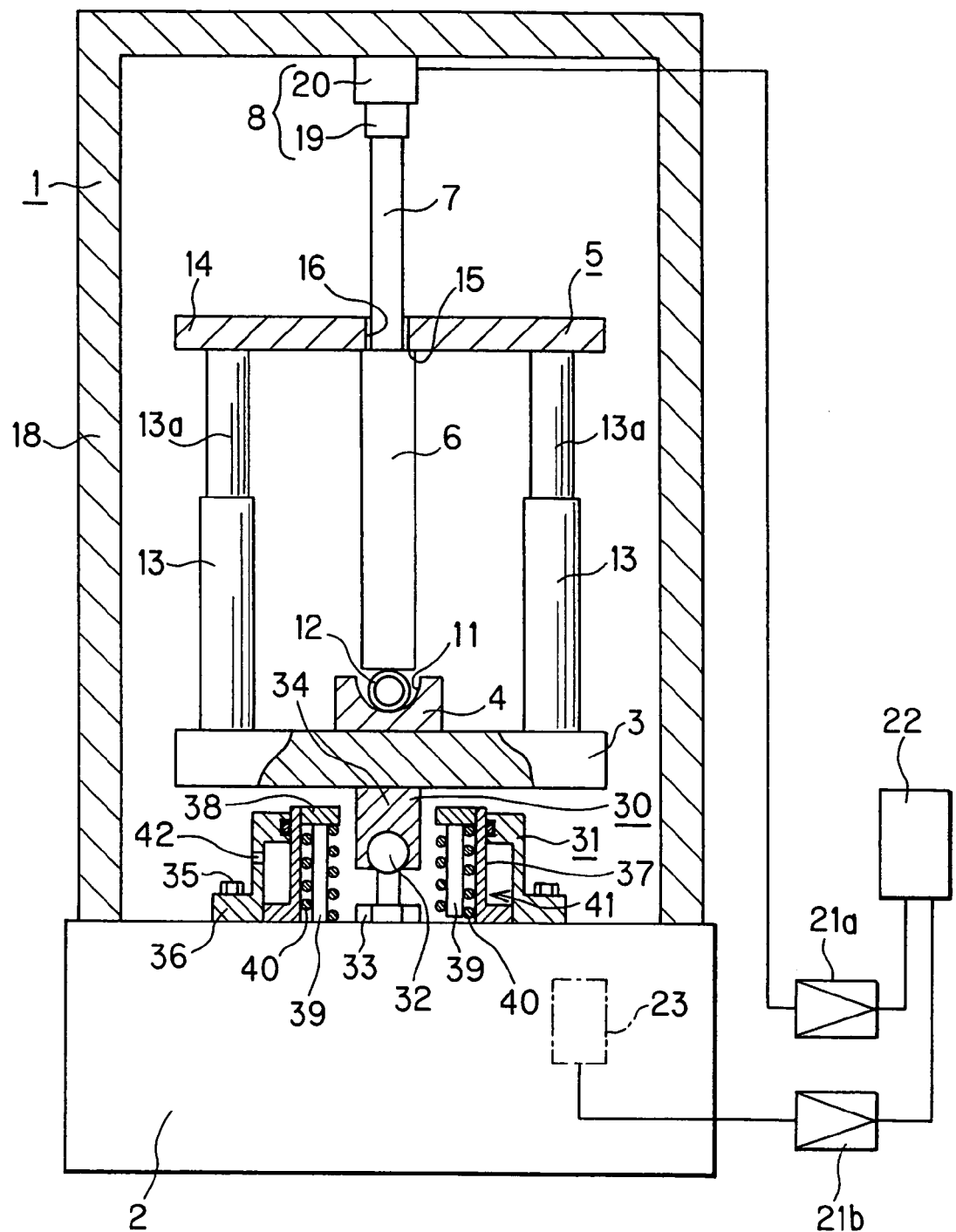
FIG. 4 is a front view showing a partial cross-section illustrating an upper table and an inner tube of the vibrating device in a raised state.

Next, a second embodiment as illustrated in FIG. 3 and FIG. 4 will be described.

In the diagrams, members which are the same as those of the first embodiment are labeled with the same reference numbers and description thereof is omitted.

The vibrating device 1 imparts an upward and downward vibration to the vibrating table 3 disposed above the vibrating platform 2, via the universal joint 30. The vibrating platform 2 only vibrates up and down in the portion of the universal joint 30, and it does not vibrate in the other regions thereof.

The universal joint 30 is a so-called "pillow ball", wherein a ball 32 is fixed to the vibrating platform 2 via a nut 33, and a ball receiving member 34 is fixed to the vibrating table 3, the ball 32 and the ball receiving member 34 being rotatable in any direction.

A restricting mechanism 31 is provided about the perimeter of the universal joint 30 for restricting the free movement of the universal joint 30 when a hydraulic shock absorber is installed in the vibrating device 1, for instance. The restricting mechanism 31 comprises an outer tube 36 having a larger outer diameter than the universal joint 30, and an inner tube 37 disposed slidably inside the outer tube 36. The outer tube 36 is fixed to a non-vibrating portion of the vibrating platform 2, by means of bolts 35.

A plurality of downwardly oriented guide rods 39 are provided on the inner side of an upper flange 38 of the inner tube 37, and the inner tube 37 is pushed upwards by a coil spring 40 disposed about the perimeter of these guide rods 39. In this state, as illustrated in FIG. 4 also, the upper flange 38 of the inner tube 37 makes contact with the lower face of the vibrating table 3, in such a manner that the vibrating table 3 is supported in a stationary state.

An oil chamber 41 is formed between the outer tube 36 and the inner tube 37, and if pressurized oil is supplied to this oil chamber 41 from a port 42 provided in the outer tube 36, then the inner tube 37 will be pulled down against the spring force of the spring 40, as shown in FIG. 3, thereby causing the upper flange 38 to separate from the lower face of the vibrating table 3. In this state, the universal joint 30 coupled to the vibrating table 3 becomes free to move.

The remaining composition is the same as that of the first embodiment. Next, the action of this embodiment will be described.

In order to measure the attenuation characteristics of a hydraulic shock absorber 6 provided with an installation eye 12 on the lower end section thereof, using a vibrating device 1 according to this embodiment, firstly, as shown in FIG. 4, the hydraulic oil inside the oil chamber 41 provided between the outer tube 36 and the inner tube 37 is expelled, the inner tube 37 is raised by the biasing force of the coil spring 40, and the upper flange 38 is caused to abut against the vibrating table 3, thereby fixing and supporting the vibrating table 3 in such a manner that the vibrating table 3 cannot move freely by means of the universal joint 30.

Thereupon, the piston rod 7 of the hydraulic shock absorber 6 to be measured is passed through the through hole 16 of the upper table 14 which has been raised previously to a raised position, whereupon the lower end section of the hydraulic shock absorber 6 is placed on the installation surface 11 of the lower installation section 4. The overall length of the hydraulic shock absorber 6 can be shortened by pressing and contracting the piston rod 7.

Thereupon, the piston rod 7 is caused to extend, and the upper end section thereof is fixed to the upper side universal joint 19 of the upper installation section 8.

Next, when the piston rods 13a of the hydraulic cylinders 13 are caused to contract, the upper table 14 descends, the upper end of the main body section of the shock absorber engages with the edge section 15 of the through hole 16, and the hydraulic shock absorber 6 is pressed towards the vibrating table 3. Since the supporting recess surface 11 of the installation section 4 of the vibrating table 3 which supports the installation eye 12 on the lower end section of the hydraulic shock absorber 6 has a hemispherical recess surface, then the installation eye 12 moves over the arc-shaped surface and is automatically centered in position and held in a stable position, as shown in FIG. 3.

In this state, if the hydraulic cylinders 13 are set to a locked state, then the hydraulic shock absorber 6 is held accurately in a previously determined position in the vibrating device 1.

Hydraulic oil is then supplied to the oil chamber 41 in the restricting mechanism 31, the inner tube 37 is caused to descend while compressing the coil spring 40 due to the pressure of the hydraulic oil, and the restriction of the universal joint 30 is removed in such a manner that the universal joint 30 becomes able to move freely in a three-dimensional fashion as shown in FIG. 3. Therefore, even if the central axis of the hydraulic shock absorber 6 is misaligned when it is installed, this misalignment is absorbed by a swinging movement of the universal joint 30.

If the vibrating platform 2 is operated in this state, then the hydraulic shock absorber 6 installed on the vibrating table 3 performs a repeated upward and downward movement with respect to the piston rod 7, in a state where the central axis of the hydraulic shock absorber 6 is corrected by the centering action of the universal joint 30. Due to the extending and contracting action of the hydraulic shock absorber 6, a load signal is output from the load cell 20 and a displacement signal is output from the displacement sensor 23, and on the basis of the values of these signals, the attenuation characteristics corresponding to the piston speed of the hydraulic shock absorber 6 are displayed on the attenuation display device 22.

According to this embodiment, even if there is some misalignment of the central axis of the hydraulic shock absorber 6 when it is installed on the vibrating table 3, this misalignment can be corrected by the action of the universal joint 30, and therefore accurate measurement can be performed.

Moreover, since a restricting mechanism 31 for restricting the action of the universal joint 30 is provided, in such a manner that the universal joint 30 is not able to perform a swinging movement when the hydraulic shock absorber 6 is installed on the vibrating table 3, then it is also possible to prevent the installation of the hydraulic shock absorber 6 from becoming unstable due to the vibrating table 3 rotating in any direction during the installation of the hydraulic shock absorber 6.

This invention is not limited to the foregoing embodiments, and it may also be implemented in a modified fashion, as described below, for example.

Above, the upper table 14 was raised and lowered by means of hydraulic cylinders 13, but apart from hydraulic means, it is also possible to use a pneumatic mechanism, electric motor, or the like.

An upper table 14 was used as a holding section for fixing and supporting the hydraulic shock absorber 6, but the invention is not limited to this and it is also possible to employ a mechanism whereby the hydraulic shock absorber 6 is grasped in a chuck, or the like, and lowered in the downward direction.

The inner tube 37 was raised and lowered by supplying hydraulic oil to the oil chamber 41 between the outer tube 36 and the inner tube 37, but it is also possible to control the inner tube 37 by supplying air to the oil chamber 41.

Moreover, in this embodiment, the movement of the universal joint 30 is restricted by holding the inner tube 36 while causing the inner tube 36 to abut against the vibrating table 3, but the invention is not limited to this, and it is also possible to employ a structure whereby a connecting section for connecting the ball 32 of the universal joint 30 and the ball receiving member 34 is held directly in a chuck like device, thereby restricting the movement of same.

The invention claimed is:

1. A vibrating device for measuring the attenuation characteristics of a hydraulic shock absorber, comprising:
   a vibrating table provided on a vibrating platform vibrating upwards and downwards with respect to the vibrating platform;
   a lower side installation section provided on the vibrating table and having a hemispherical recess surface for supporting the lower end portion of the hydraulic shock absorber;
   a holding section provided on the vibrating table for pressing and holding the hydraulic shock absorber towards the vibrating table; and
   an upper side installation section provided on a supporting frame coupled to the vibrating platform for supporting the front end of the piston rod of the hydraulic shock absorber.

2. The vibrating device as defined in claim 1,
   wherein the holding section is constituted by:
   a pair of hydraulic cylinders attached to the vibrating table;
   a horizontal upper table coupled to the front ends of the piston rods of the hydraulic cylinders; and
   a through hole formed in the upper table for engaging with the main body section of the hydraulic shock absorber.

3. The vibrating device as defined in claim 1,
   wherein the upper side installation section comprises a universal joint for coupling with the front end section of the piston rod.

4. A vibrating device for measuring the attenuation characteristics of a hydraulic shock absorber, comprising:
   a vibrating table provided on a vibrating platform vibrating upwards and downwards with respect to the vibrating platform;
   a universal joint for coupling the vibrating platform with the vibrating table;
   a restricting mechanism for restricting the free movement of the universal joint;
   a lower side installation section provided on the vibrating table for supporting the lower end portion of the hydraulic shock absorber; and
   an upper side installation section provided on a supporting frame coupled to the vibrating platform for supporting the front end of the piston rod of the hydraulic shock absorber.

5. The hydraulic vibrating device as defined in claim 4,
   wherein the restricting mechanism is constituted by:
   an outer tube fixed to the vibrating platform; an inner tube sliding with respect to the outer tube; a spring for biasing the inner tube in an extending direction in such a manner that it abuts against the lower face of the vibrating table; and an oil chamber for causing the inner tube to contract against the biasing force of the spring, due to hydraulic pressure.

6. The vibrating device as defined in claim 4,
   wherein the lower installation section has a hemispherical recess surface for supporting the lower end section of the hydraulic shock absorber.

7. The vibrating device as defined in claim 4, further comprising:
   a holding section provided on the vibrating table for pressing and holding the hydraulic shock absorber towards the vibrating table.

8. The vibrating device as defined in claim 4,
   wherein the upper installation section comprises a universal joint for coupling with the front end section of the piston rod.

* * * * *